United States Patent [19]

Haack

[11] Patent Number: 5,016,807

[45] Date of Patent: May 21, 1991

[54] METHOD FOR PRODUCING WORKPIECES OF METAL

[75] Inventor: Johannes Haack, Lyss, Switzerland

[73] Assignee: Feintool International Holding, Lyss, Switzerland

[21] Appl. No.: 441,890

[22] Filed: Nov. 27, 1989

[30] Foreign Application Priority Data

Dec. 7, 1988 [DE] Fed. Rep. of Germany ....... 3841205

[51] Int. Cl.⁵ .............................................. B23K 31/02
[52] U.S. Cl. .................... 228/170; 228/160; 228/161; 228/177; 228/190; 29/888.09; 29/888.091; 74/579 E
[58] Field of Search ............... 228/190, 160, 161, 177, 228/139, 140, 170; 156/253, 154, 221, 222; 74/579 R, 579 E; 29/156.5 A

[56] References Cited

U.S. PATENT DOCUMENTS

| | | | |
|---|---|---|---|
| 559,566 | 5/1896 | Brintnall | 228/140 |
| 954,923 | 4/1910 | Brock | 228/190 |
| 1,744,588 | 1/1930 | Strauss | 228/190 |
| 2,479,325 | 8/1949 | Dominico | 228/190 |
| 3,074,151 | 1/1963 | Kroekel | 228/190 |
| 3,330,027 | 7/1967 | Kernander et al. | 228/190 |
| 3,670,397 | 6/1972 | Lewis | 228/190 |
| 3,822,609 | 7/1974 | Kotoc | 74/579 E |
| 4,430,783 | 2/1984 | Wherry | 228/173.6 |
| 4,572,271 | 2/1986 | Nakashima et al. | 228/190 |
| 4,687,960 | 8/1987 | Frister | 228/190 |

Primary Examiner—Sam Heinrich
Attorney, Agent, or Firm—Bachman & LaPointe

[57] ABSTRACT

In a method for producing workpieces of metal having profiled outer and/or inner contours which have any desired shape contours and are or can be profiled in thickness, the workpiece (R) is to be divided in terms of construction into simple part-profiles (4, 7, 13, 14), which are then produced by precision blanking and then fitted together and joined to one another by lamination to form the finished part.

9 Claims, 2 Drawing Sheets

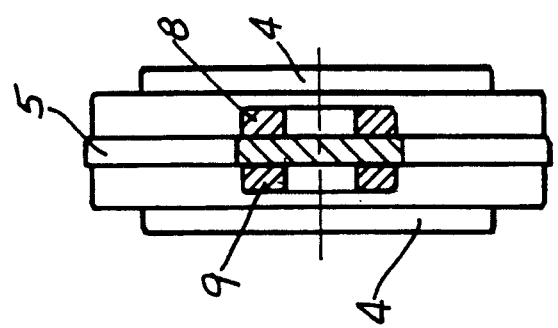
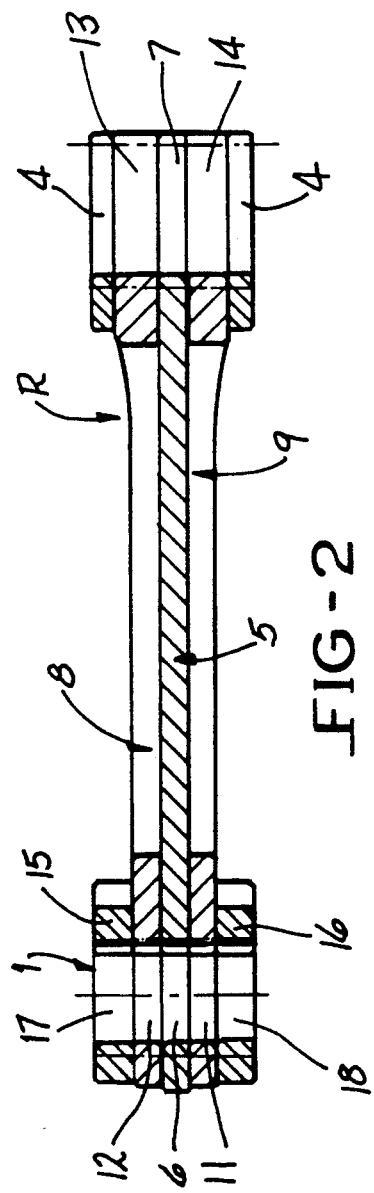
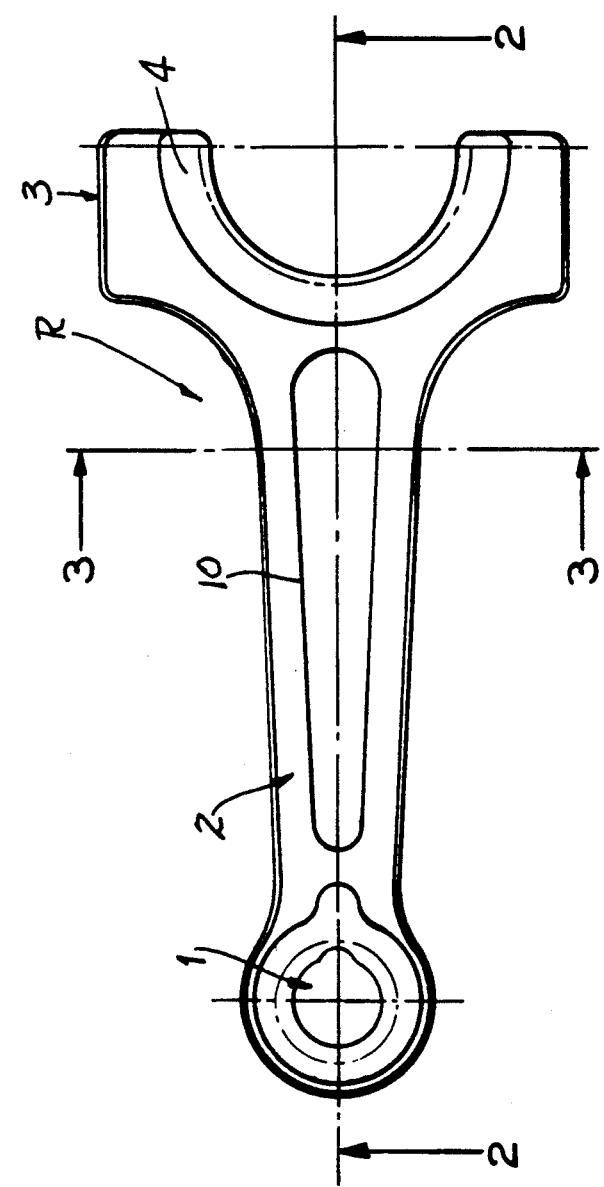

METHOD FOR PRODUCING WORKPIECES OF METAL

BACKGROUND OF THE INVENTION

The present invention relates to a method for producing workpieces of metal having outer and/or inner contours which have any desired shape contour and are or can be profiled in thickness.

Workpieces of this kind are usually produced by casting or under high loads as a forging with subsequent mechanical working. Both methods are expensive and forging dies are furthermore for their part subject to high wear. Also suitable is, furthermore, the cutting method, although this is very expensive.

The inventor has set himself the object of developing a process of the type mentioned above by means of which the abovementioned workpieces can be produced with considerably lower production costs and a higher accuracy.

SUMMARY OF THE INVENTION

The foregoing object is achieved by the fact that the workpiece is divided in terms of construction into simple part-profiles which are then produced by precision blanking and then fitted together and joined to one another by lamination to form the finished part.

The production of part-profiles by means of precision blanking has the considerable advantage that, for example, on the one hand the costs associated with molds for casting, forging dies for forging are dispensed with.

Only the precision blanking dies in the precision blanking press are employed. However, with present-day production methods this can be produced more easily, more economically and, in particular, also with greater exactness. The subsequent production of the part-profiles by precision blanking proceeds with considerably greater rapidity and, therefore, in turn more economically. If, for example, part-profiles of different thickness are required, this can also be taken into account at as early a stage as the strip of material from which the profile is cut. According to the invention, joining can then be effected by soldering, welding, bonding or using mechanical devices. However, this is not intended to limit the inventive idea since, in particular, future methods of joining, such as, for example, laser welding, are very promising.

Also to be emphasized is, furthermore, the lower weight of a workpiece produced in this way since, by virtue of precision blanking, the corresponding metal can easily be removed in particular at points where strengthening or reinforcements are not necessary.

The present method is particularly suitable for producing a connecting rod, which comprises a shank, on which a piston pin boss on the one hand and a connecting rod bearing on the other hand are integrally formed. Both piston pin boss and connecting rod bearing should be surrounded by appropriate bearing bushes.

According to the invention, this connecting rod part is manufactured from two parts. On the one hand, a central strip is precision-blanked, said central strip having, at one end, a hole for the piston pin boss and, at the other end, a semicircle for the connecting rod bearing. This central strip can be produced in one pass by precision blanking.

Both a connecting rod upper part and a connecting rod lower part are furthermore produced by precision blanking, each having a cut-out for the piston pin boss and a semicircular cut-out for the connecting rod bearing. Precision blanking is also chosen as the production method for the bearing bushes. All these parts are then fitted together, as mentioned above, for example joined together by soldering, welding, bonding or the like. A second connecting rod part for the formation of a boss for the connecting rod bearing is produced in the same way.

In practice, a connecting rod of this kind has been found to have a completely adequate resistance to deforming force, such as, for example, tensile or torsional forces.

The lamination of the individual parts can be performed differently depending on the required moment of resistance.

In order to improve the bosses, these should be re-bored after the production of the connecting rod parts. Likewise, it is important to mill the joining surface of the connecting rod parts level.

BRIEF DESCRIPTION OF THE DRAWINGS

Further advantages, features and details of the invention can be found in the following description of a preferred illustrative embodiment and by reference to the drawing: this shows, in FIG. 1 a plan view of a connecting rod part, produced by means of the method according to the invention;

FIG. 2 a longitudinal section through the connecting rod part along line 2—2 in FIG. 1;

FIG. 3 a cross-section through the connecting rod part along line 3—3 in FIG. 1;

DETAILED DESCRIPTION

Figure 6:
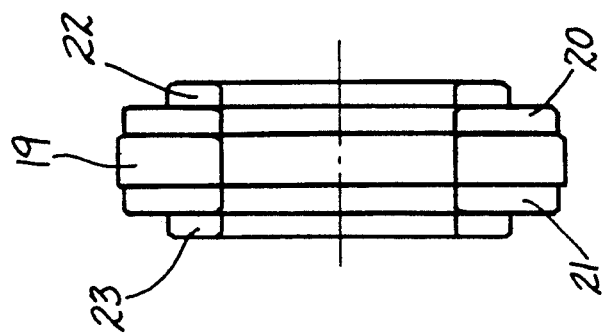
FIG. 6 an end elevation of the connecting rod part according to FIG. 4.
Figure 5:
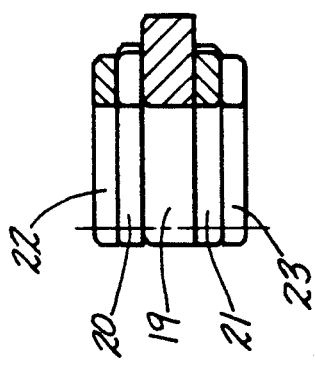
FIG. 5 a cross-section through the connecting rod part along line 5—5 in FIG. 4.

According to FIG. 1, a connecting rod part R has a piston pin boss 1, adjoining which is a shank 2. Half of a connecting rod bearing 3 is illustrated opposite the piston pin boss 1, half of a boss also being indicated.

As seen in longitudinal section according to FIG. 2, the connecting rod part R comprises a central strip 5, which, in particular, continuously forms the shank 2. This central strip 5 is cut-out of a corresponding strip of material by means of precision blanking. In the same or a subsequent pass, a corresponding hole 6 for the piston pin boss 1 and, at the other end, a semicircle 7 for the connecting rod bearing 3 is cut-out of the central strip 5.

A strip-shaped connecting rod upper part 8 and a corresponding, strip-shaped connecting rod lower part 9 are produced from another strip of material by precision blanking. Connecting rod upper part 8 and connecting rod lower part 9 can be produced from a strip of material of different thickness.

For the purpose of weight reduction, both connecting rod upper part 8 and connecting rod lower part 9 are provided in the region of the shank 2 with an elongate hole 10, it also being possible for this to take the form of a plurality of round holes or, alternatively, to have any desired shape. These holes are provided or can be provided with overmeasure and are then brought mechanically to the final form, for example by milling or reboring. Furthermore, both connecting rod upper part 8 and connecting rod lower part 9 have a cut-out 11 and 12, in the form of a hole, for the piston pin boss 1 at one end and a semicircular cut-out 13 and 14 for the connecting rod bearing 3 at the other end.

In the region of the piston pin boss 1, both connecting rod upper part 8 and connecting rod lower part 9 are each lined with a bearing bush 15 and 16 respectively, for a piston pin (not shown), these bearing bushes 15 and 16 also having been produced by precision blanking. Each again possesses a corresponding precision-blanked opening 17 and 18 to produce the piston pin boss 1.

At the other end, bearing bushes 4 line both the connecting rod upper part 8 and the connecting rod lower part 9.

Figure 4:
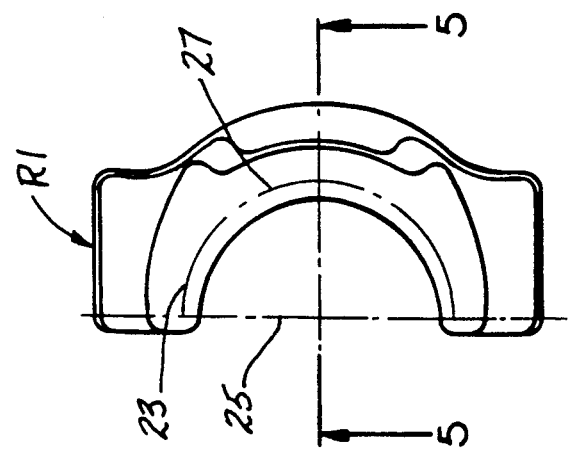
FIG. 4 a plan view of a further connecting rod part, produced by means of the method according to the invention.

A further connecting rod part R1 for the formation of a boss together with connecting rod part R is shown in FIG. 4, and in the use position this boss can surround a corresponding camshaft. Accordingly, connecting rod part R1 is of similar construction to the connecting rod bearing 3. It comprises a half-shell-shaped central strip 19, on each of both sides of which half-shell-shaped cutouts 20 and 21 and bearing bushes 22 and 23 are likewise placed. These parts too are produced individually by the precision blanking method.

The connecting rod part R overall is produced by laying connecting rod upper part and connecting rod lower part on the central strip 5 and joining them to it. Joining can be effected by soldering or welding, and laser welding has also been considered. Of course, joining can also be effected by a suitable adhesive. There is no intention to limit the inventive idea in this respect. In the case of a soldered joint using copper brazing solder, the soldering temperature can be used immediately for the subsequent heat treatment operation without additional heating.

Furthermore, the bearing bushes 15, 16 and 4 are then disposed around the piston pin boss 1 and the connecting rod bearing 3 respectively, and likewise joined by soldering or welding to the connecting rod upper part 8 and connecting rod lower part 9 respectively. It is incidentally also possible to conceive of the lamination of the individual parts in some other way.

Connecting rod part R1 too is produced in the same manner.

In a further operation, the connecting rod parts R and R1 are milled off along the chain-dotted lines 24 and 25 in FIG. 1 and FIG. 4. The rounded edges formed in precision blanking are thereby removed, so that placement of connecting rod part R1 on connecting rod part R and joining it to the latter are improved or made at all possible. In the use position, this connecting rod part R1 is joined to connecting rod part R, this being accomplished, for example, by welding or appropriate connection elements.

Furthermore, the individual bosses are rebored, this being indicated by the circular lines 25, 26 and 27 in FIGS. 1 and 4.

I claim:

1. A method for producing complex composite metal workpieces having profiled contours comprises forming a plurality of fine-blanked sample metal part-profiles of varying thicknesses and shapes by precision blanking and thereafter joining said plurality of part-profiles together so as to form the complex composite profile.

2. A method as claimed in claim 1 wherein joining is effected by soldering with AgCu, Cu or ZnCu solder.

3. A method as claimed in claim 1 wherein joining is effected by welding and laser welding.

4. A method as claimed in claim 1, wherein joining is effected by bonding.

5. A method as claimed in claim 1 wherein joining is effected by mechanical devices such as screw bolts and rivets.

6. A method for producing a connecting rod with piston pin bosses, piston rod bearing, shank and bearing bushes, wherein at least one connecting rod part comprising a central strip with a hole for the piston pin boss and a semicircle for the connecting rod bearing, a connecting rod upper part and a connecting rod lower part, each having a cutout for the piston pin boss and a semicircular cut-out for the piston rod bearing and each having two bearing bushes for the piston pin boss and two bearing bushes for the connecting rod bearing are produced and joined together by soldering, welding or bonding.

7. A method as claimed in claim 6, wherein a second connecting rod part comprising a half-shell-shaped central strip, two half-shell-shaped cut-outs, and bearing bushes, these parts being produced by precision blanking and joined together by soldering, welding or bonding.

8. A method as claimed in claim 7, wherein the joining surfaces between connecting rod parts are milled off.

9. A method as claimed in claim 6, wherein, after the production of the individual connecting rod parts, the bosses for piston pin and the connecting rod bearing are rebored.

* * * * *